INVENTOR.
Manford R. Happold

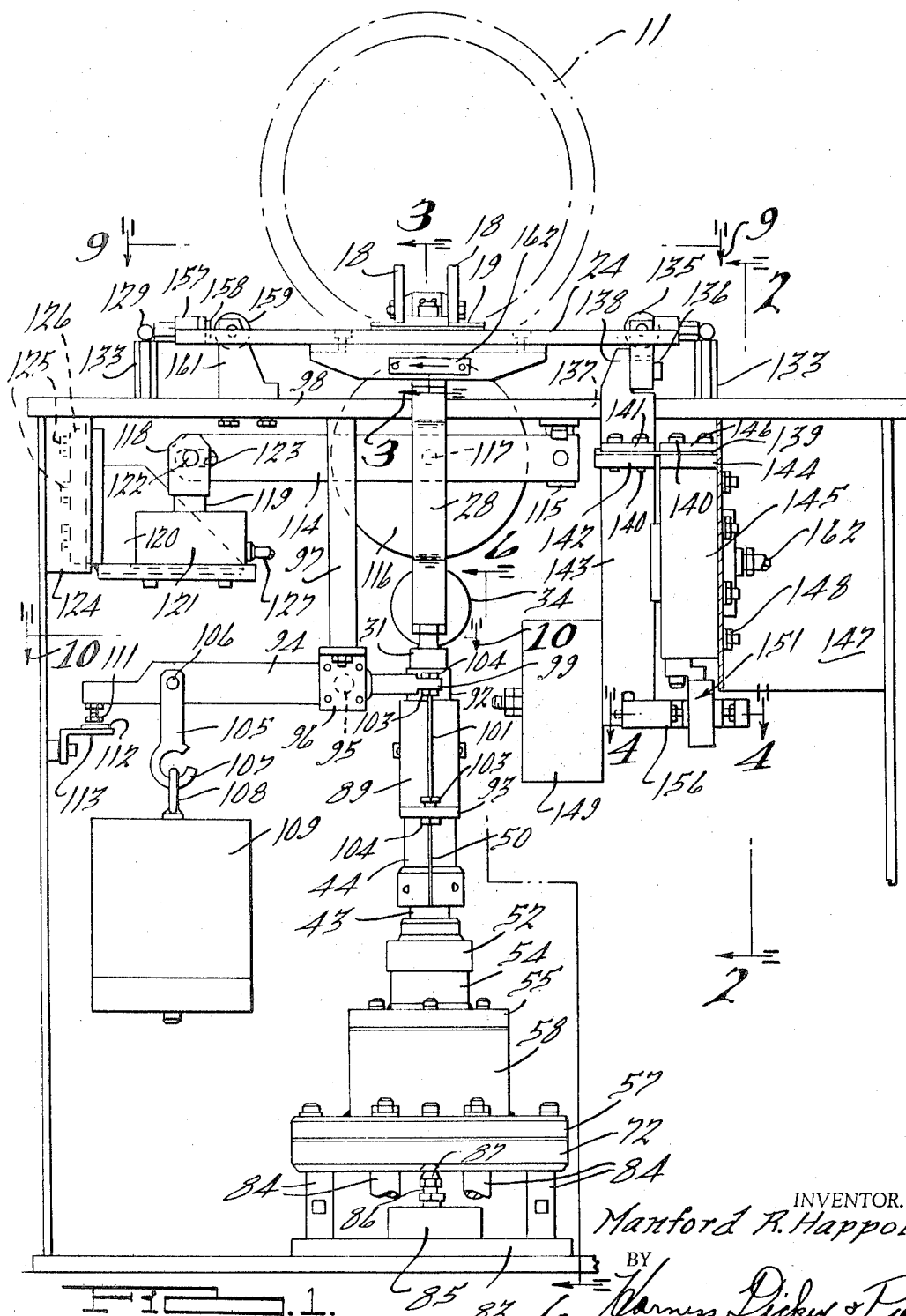

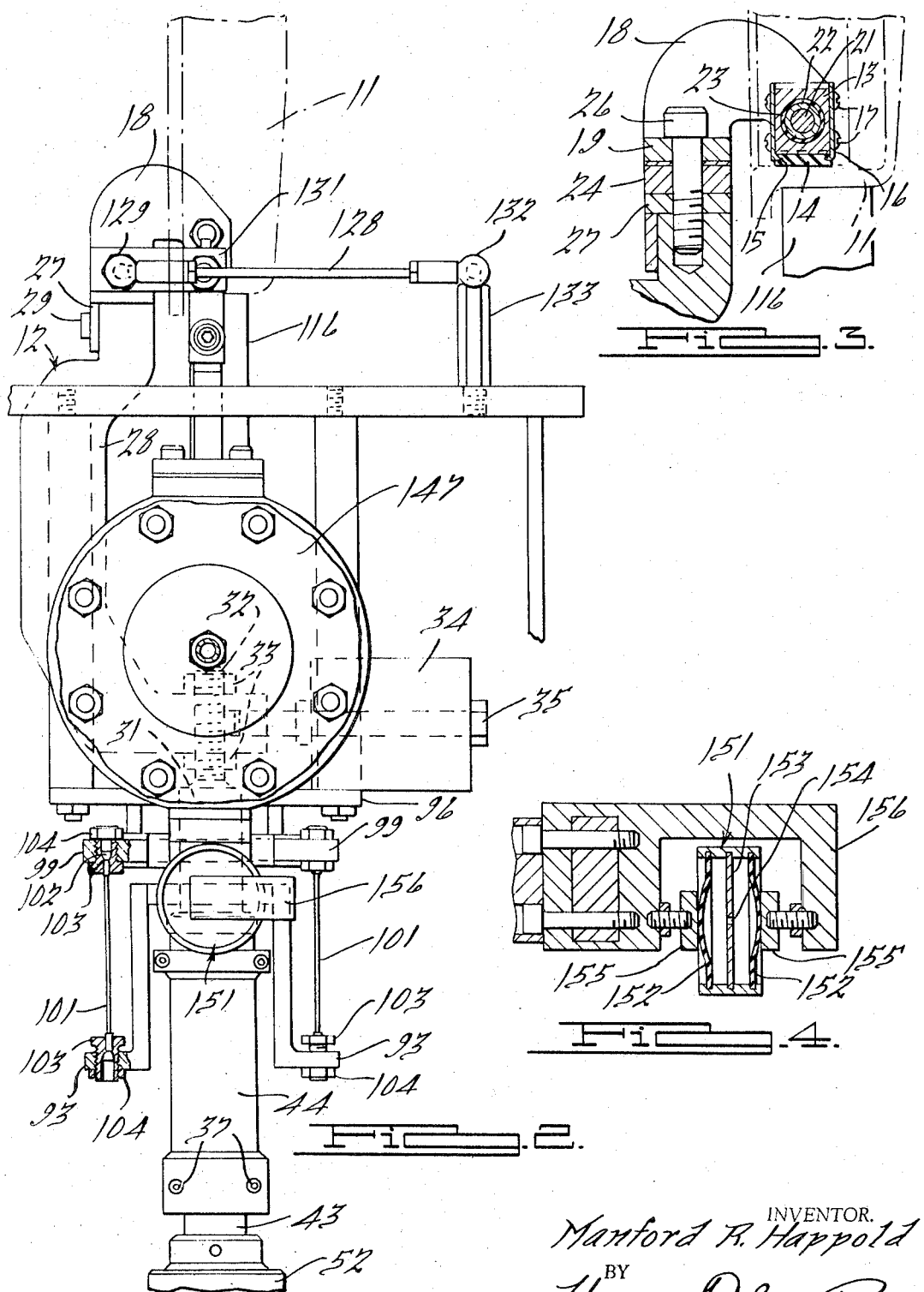

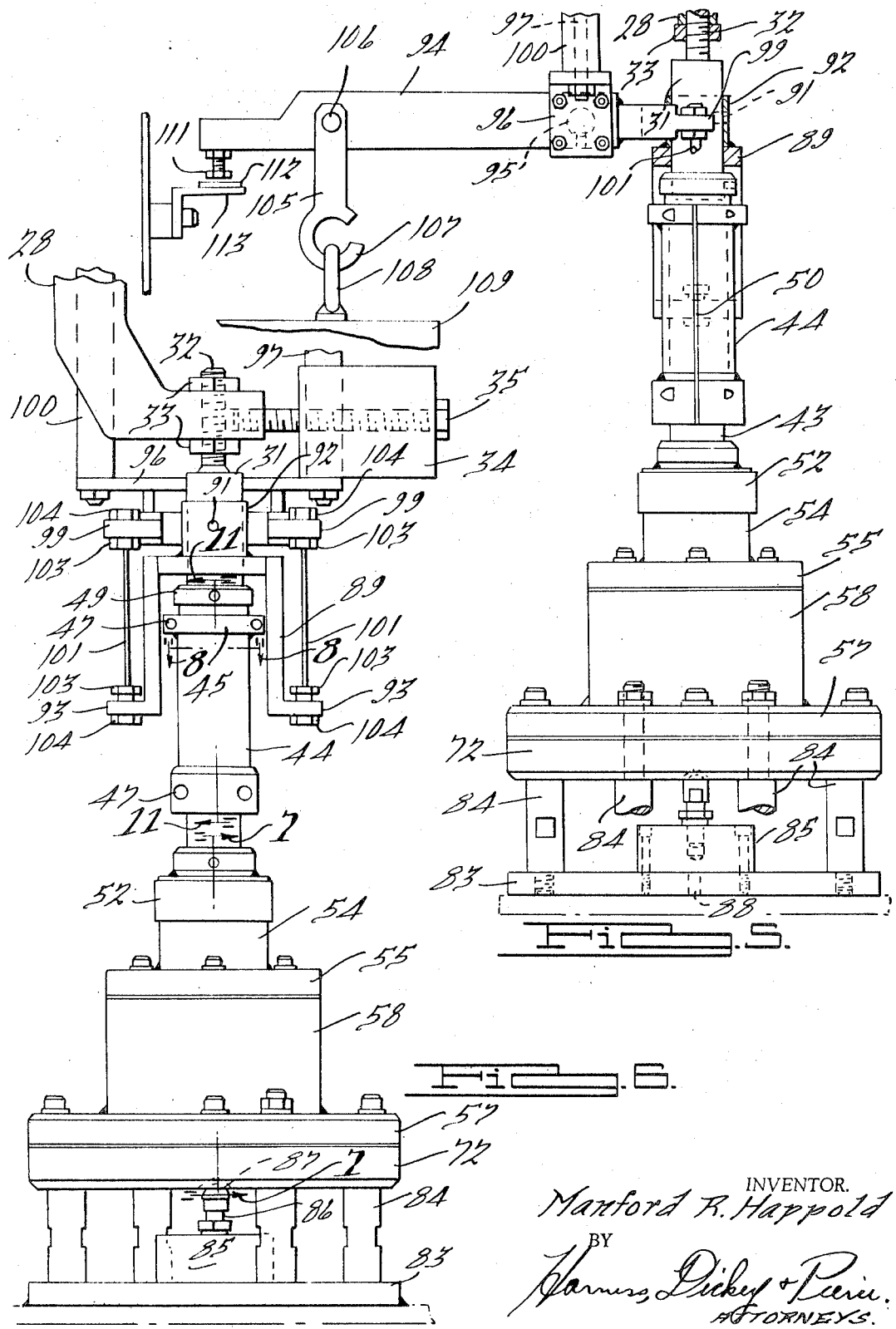

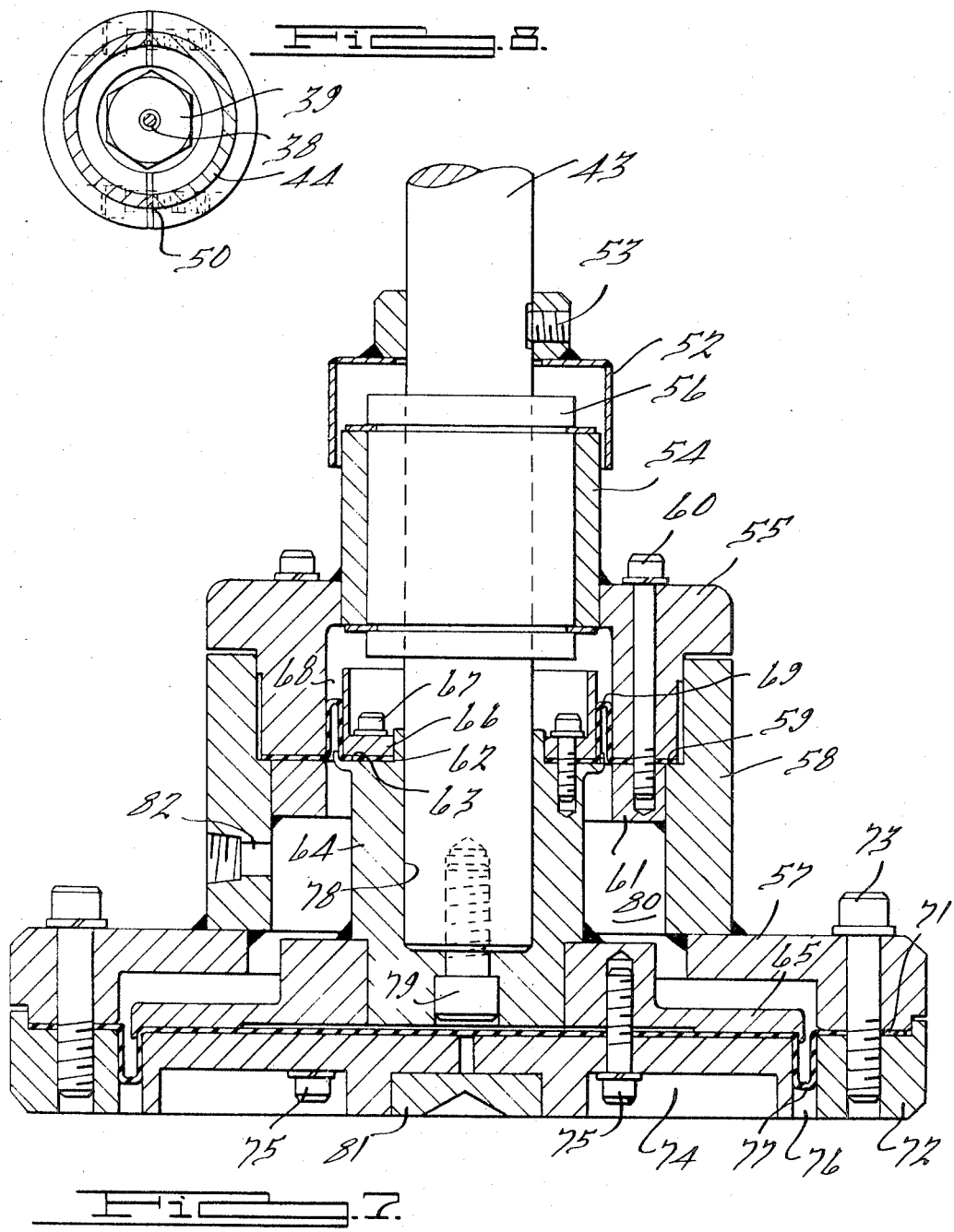

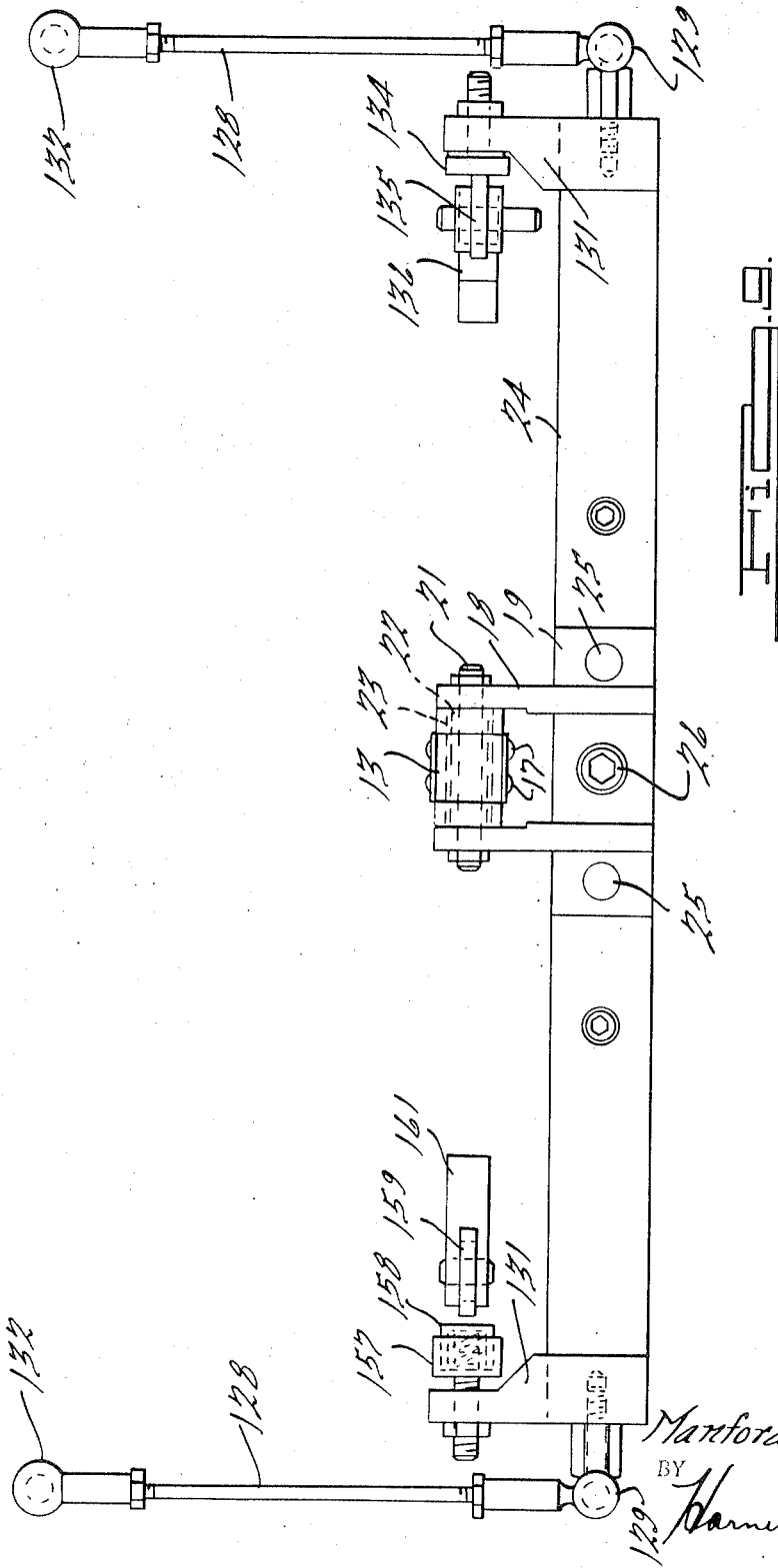

United States Patent Office 3,451,253
Patented June 24, 1969

3,451,253
BRAKE LINING TESTING MACHINE
Manfred R. Happold, Farmington, Mich., assignor to Link Engineering Company, a corporation of Michigan
Filed Aug. 17, 1967, Ser. No. 661,414
Int. Cl. G01n 3/56
U.S. Cl. 73—9          8 Claims

ABSTRACT OF THE DISCLOSURE

The invention relates to a mechanism for applying a load to a sample of brake lining to be tested through flexible means which eliminates any binding in the load applying elements so that the applied pressure can be accurately measured. The structure compares the frictional force occurring between the sample and rotating brake drum with known loads which urges the sample against the brake drum surface. An accurate chart can be plotted between the applied loads and the resulting frictional forces.

Background of the invention

In an application filed by H. W. Link, Ser. No. 599,606, filed Dec. 6, 1966, for "Brake Lining Testing Device," a machine is illustrated for testing disk brakes to which the device of the present invention may be attached. In the present invention, the drum type of brake is illustrated by way of example.

Summary of the invention

The invention pertains to the application of air under pressure to a cylinder which applies a load to a brake material sample which, in the instant case, may have an area of 1 square inch. The load is applied through cables to eliminate any binding so that the pressure of air applied to the piston area may be taken as the load being applied to the brake lining sample. The brake drum is rotated while the sample is forced thereagainst and the frictional load between the sample and surface is recorded on a pressure-responsive device. As a result, a chart can be made from the applied loads and the frictional forces resulting between the brake lining sample and the surface of the brake drum.

Brief description of the drawings

FIG. 1 is a view in elevation of a force applying and a pressure-responsive device for testing brake lining samples embodying features of the present invention;

FIG. 2 is an enlarged sectional view of the structure illustrated in FIG. 1, taken on the line 2—2 thereof;

FIG. 3 is an enlarged broken sectional view of the structure illustrated in FIG. 1, taken on the line 3—3 thereof;

FIG. 4 is an enlarged broken sectional view of the structure illustrated in FIG. 1, taken on the line 4—4 thereof;

FIG. 5 is an enlarged broken view of the structure illustrated in FIG. 1;

FIG. 6 is an enlarged broken view of the structure illustrated in FIG. 1, as viewed from the line 6—6 thereof;

FIG. 7 is an enlarged sectional view of the structure illustrated in FIG. 6, taken on the line 7—7 thereof;

FIG. 8 is an enlarged sectional view of the structure illustrated in FIG. 6, taken on the line 8—8 thereof;

FIG. 9 is an enlarged view of the force applying bar of FIG. 1, as viewed from the line 9—9 thereof;

Description of the preferred embodiment

Figure 10:
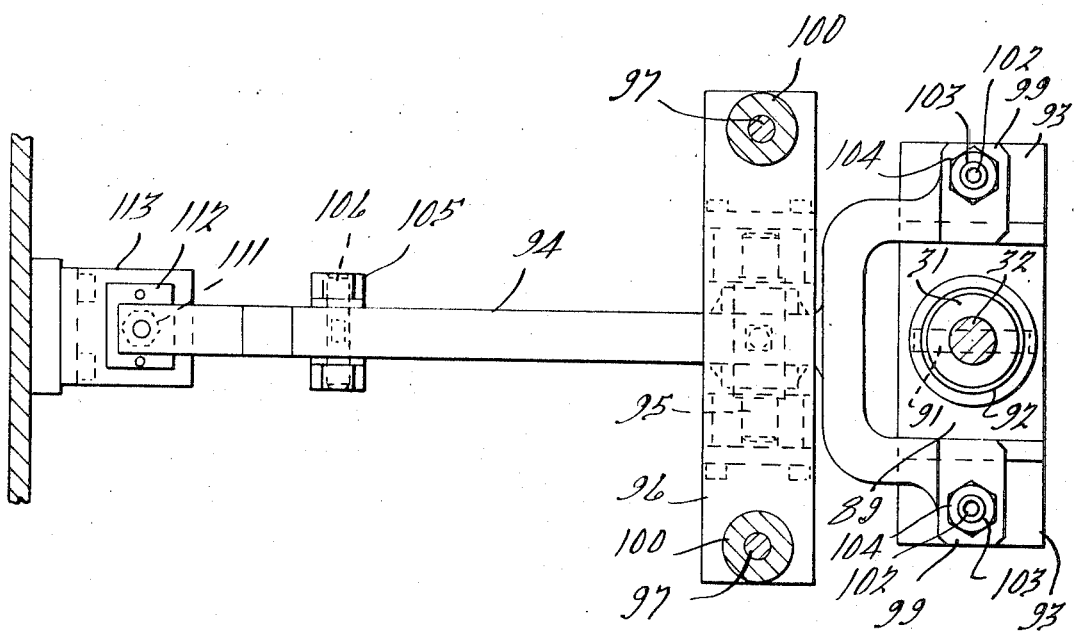
FIG. 10 is an enlarged sectional view of the structure illustrated in FIG. 1, taken on the line 10—10 thereof.

The device of the present invention is illustrated as being applied to a sample being tested on a brake drum. It is to be understood that the device is just as usable for testing brake lining samples on disk brakes, as will be pointed out hereinafter. A brake drum 11 has a C-shaped arm 12 with a clamping head 13 on one end for supporting a test sample 14 in position to engage the inner peripheral braking surface of the drum 11. In the present case, the test sample is a 1-inch square section of the brake lining secured by knife edges 15 on blades 16 which are attached to the head 13 by screws 17. By loosening the screws on one of the blades, the test sample can be removed and a new sample can be supported by the knife edges when the blade is again secured to the head 13 by tightening the two screws 17.

The head 13 is supported between a pair of angle shaped fingers 18 on a shaft 21 mounted in a sleeve 22 within a sleeve 23 of elastomeric material. This permits the head to rotate on the shaft 21 while the elastomeric sleeve 23 cushions any vibration set up during the test. The fingers 18 extend from a plate 19 secured to a cross bar 24 which is accurately located by dowel pins 25 and secured thereto by a screw 26, as illustrated in FIG. 9. The screw also secures an angle-shaped bracing element 27 and the upper end of a C-shaped element 28. A plate 29 on the element 27 has an arrow showing the direction of rotation of the drum 11. The lower end of the C-shaped element 28 has a boss 31 supported thereon by a threaded extension 32 locked in position by a pair of nuts 33 and disposed on the center line of the shaft 21. A counterweight 34 is adjustably mounted on a screw 35 extending from the end of the C-shaped element 28 to balance the offset portion thereof.

Figure 11:
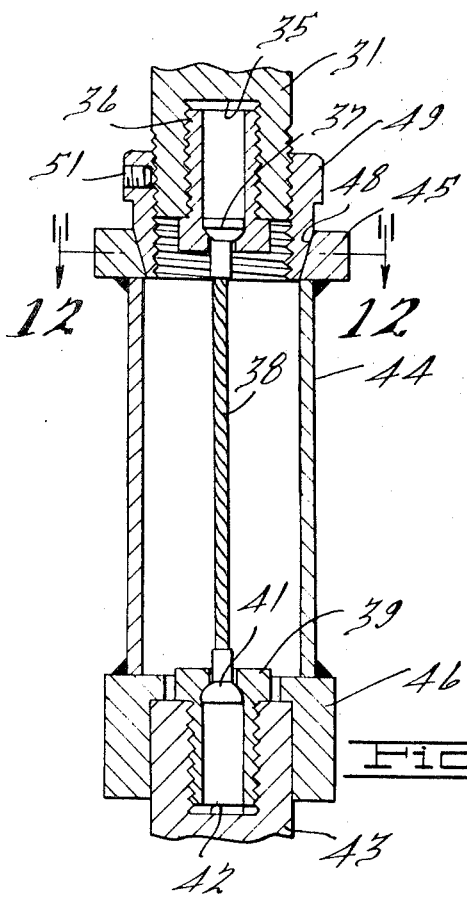
FIG. 11 is an enlarged sectional view of the structure illustrated in FIG. 7, taken on the line 11—11 thereof.
Figure 12:
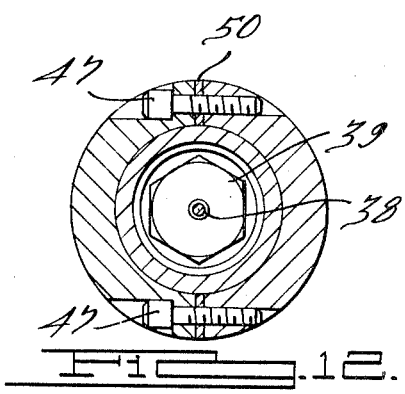
FIG. 12 is a sectional view of the structure illustrated in FIG. 11, taken on the line 12—12 thereof.

As illustrated in FIG. 11, the boss 31 has a threaded aperture 35 containing a hollow stud 36 in which a head 37 at one end of a cable 38 is secured. A similar stud 39 supports a head 41 at the other end of the cable 38 when screwed within an aperture 42 of a piston rod 43. A tube 44 with a top flange 45 and a bottom flange 46 is slotted diametrically and secured together by screws 47 with shims 50 disposed in the slots and fixed to the end of the piston rod. The top flange 45 has a tapered central aperture 48 which receives the tapered end of a nut 49 which is threaded on the boss 31 and secured in position by a set screw 51. When the piston rod 43 is pulled downwardly, the cable 38 will stretch and unseat the nut from the tapered surface 48 to thereby eliminate any binding between the piston rod 43 and the boss 31. Upon the upward movement of the piston rod 43 the cable 38 is rendered inoperative and the test sample will be raised from the brake drum by the upward movement of the sleeve 44.

The piston rod 43 has a shield 52 secured thereon by a set screw 53 to extend over a sleeve 54 on a removable head 55, as illustrated in FIG. 7. The sleeve 54 supports a bearing 56 of a type having axially movable balls therein for aligning the piston rod and guiding it relative to the head. A clamping disk 57 has a cylindrical extension 58 to which the head 55 is secured by a plurality of screws 60 for clamping the peripheral edge of a diaphragm 59 to a ring 61 within the cylindrical extension 58. The diaphragm has a central aperture 62, the material adjacent thereto being disposed in an annular recess 63 in a cylindrical boss 64 extending upwardly from a sealing disk 65. The material defined by the aperture 62 is clamped in position by a cup-like washer 66 being secured in position by a plurality of screws 67. A space 68 is provided between the wall of the washer 66 and the aperture in the head 55 into which the annular U-shaped portion 69 of the diaphragm extends. The clamping disk 57 secures the peripheral edge portion of a diaphragm 71 to a ring 72 when secured together by a plurality of screws 73. The disk 65 secures the central portion of the diaphragm 71 to a plate 74 when secured together by a plurality of screws 75. A space 76 is provided between the plate 74 and ring 72 in which the annular U-shaped portion 77 of the diaphragm extends.

The boss 64 has a central aperture 78 which receives the lower end of the piston rod 43 to which it is secured by a screw 79. The plate 74 has a disk 81 in the center thereof containing a conical recess. The extension 58 has an aperture 82 with a pipe thread at the outer end through which a fluid is admitted to the pressure area 80 between the diaphragms 59 and 71. When the area 80 is pressurized the disk 65 and piston rod 43 are urged downwardly. The ring 72 is joined to a base plate 83 by a plurality of legs 84. A ram 85 is secured centrally of the base plate 83 having a piston rod 86 extending therefrom containing a semicylindrical head 87 on the end which is disposed adjacent to the conical recess of the disk 81 at the center of the plate 74. Fluid passes to and from the ram 85 through an aperture 88 in the base plate 83. When fluid is introduced into the ram 85 the inlet 82 of a cylindrical extension 58 directly or through a pressure proportioning device. The same pressure or a proportion thereof that is applied to the area 80 is applied to the cylinder 121. As the pressure increases in the area 80 and the load on the piston rod 43 and sample 14 increases, the drum 116 will be urged upwardly with an increasing force to engage the drum 11 on the side opposite to that engaged by the test sample to balance the pressure exerted by the sample and prevent the drum from distorting, as illustrated in FIG. 3.

The cross bar 24 is stabilized for free endwise movement by cables 128 which are connected by a ball and socket joint 129 to the ends of the crossbar to which rearwardly extending arms 131 are secured. The opposite ends of the cable are connected by ball and socket joints 132 to posts 133 secured at the top 98 of the base frame. The right-hand arm 131, as viewed in FIG. 9, has a head 134 engaged by a bearing ring 135 pivotally secured on a block 136 which extends through a slot 137 in the base top 98. The block 136, as illustrated in FIG. 1, is secured to a torque arm bracket 138 which is secured to a hinge strap 139 and to a torque arm 143 by flanges 141 and 142 thereof and screws 140. The opposite end of the hinge strap 139 is secured to a platform portion 144 of a pressure measuring device 145 by a clamping plate 146 and screws 140. The pressure measuring device 145 may be of any type known to be suitpiston rod 43 to be urged downwardly. This applies a load on the cables 101 to raise the stop element 111 from the pad 112 and applies a load to the cable 38 which stretches to permit the collar 49 to unseat from the flange 45 to eliminate any binding to the force applied to the test sample. The friction between the test sample and the clockwise rotating brake drum causes the cross bar 24 to move toward the left to have the head 134 engage the bearing ring 135 and causes the torque arm 143 to apply a force to the device 145. The different fluid pressures applied to the area 80 are recorded as well as the resulting pressures on the fluid from the conduit 162. From these readings a graph can be plotted between the applied forces and the resulting frictional pressures. The use of the cables 38, 101 and 128 provides flexibility to the assembly and removes any binding from the force applying and recording parts which might otherwise provide false readings. It is to be understood that with a slight modification the present device may be applied to the disk brake testing device illustrated in the above mentioned application. In this arrangement the drum 116 and its actuating parts are eliminated. The bushing 31 is conncted to the rod 45 of the application for applying the fluid load thereto.

The split cylinder 44 which is carried about the cable 38 permits the ram 85 to move the plate 74 and the piston rod 43 upwardly to raise the cross bar 24, the U-shaped arms 18 and the test sample supporting head 33 upwardly away from the drum so that the head 13 can be rotated and to have the tested sample removed and a new sample applied thereto. The cylinder 121 is adjustable on its support within the length of the slot 123 to change the lever arm relationship of the lever 144 on opposite sides of the pin 117. With this arrangement, the load on the drum 116 will balance that applied to the brake drum 11 by the force on the sample. While the pressure applied to the area 80 may be the same pressure as applied to the cylinder 121, because of the cylinder's small area the actual pressure applied thereto is twice that applied to the area 80. The weight 109 balances the movable part of the pressure applying device as well as the approximate two pounds of air initially applied to the area 80 which is the point at which the calibration begins between the applied pressures and the resulting torque readings.

What is claimed is:

1. In testing device for friction occurring between a brake lining test sample and a rotatable element, a base, rotatable brake means mounted on said base, means for rotating said brake means, a longitudinally movable support on said base, a support for a brake lining test sample carried by said longitudinally movable support, pivoted means on said brake lining test sample support for rotating a brake lining test sample into position of engagment with said brake means, said pivoted support permitting the brake lining test sample to be moved from the brake means for examination and replacement, an arm in extension of said longitudinally movable support urged longitudinally therewith by the friction occurring between said brake means and brake lining test sample, a pressure responsive device actuated by said arm when its support is moved longitudinally to provide torque readings, and fluid actuated ram means having a piston rod for applying varying loads to said brake lining test sample to provide comparative load readings for the torque readings.

2. In a testing device as recited in claim 1, wherein loose connecting means joins the piston rod to said support, and a sleeve on said piston rod about said loose connecting means in engagement with said support which is raised by the piston rod to raise said lining from said brake means.

3. In a testing device as recited in claim 1, wherein the brake is of the drum type and further comprises a drum engaging the brake drum on the side opposite to that against which the brake lining is urged, and means responsive to the same fluid pressure as is applied to the piston rod for urging the drum against said brake drum.

4. In a testing device as recited in claim 3, wherein a lever arm is joined to said piston rod with a weight thereon which balances the movable elements of the fluid actuated means including an initial fluid pressure applied to said piston rod.

5. In a testing device as recited in claim 4, wherein the extending arm has a U-shaped element thereon provided with facing heads, and a dampening element on said pressure responsive device between said heads for damping said arm.

6. In a testing device as recited in claim 3, wherein said means responsive to fluid pressure is adjustable to vary the effective force applied to the drum.

7. In a testing device as recited in claim 6, wherein said lever arm is joined to said piston through a pair of cables.

8. In a testing device as recited in claim 7, wherein the device has a bearing through which the piston rod longitudinally moves and is accurately aligned.

References Cited

UNITED STATES PATENTS

| | | | |
|---|---|---|---|
| 2,266,305 | 12/1941 | Boegehold et al. | 73—7 |
| 2,944,417 | 7/1960 | Stupp | 73—9 |
| 3,358,495 | 12/1967 | Baist | 73—7 |
| 3,360,977 | 1/1968 | Herman | 73—9 |
| 3,380,288 | 4/1968 | Bradley | 73—9 |

LOUIS R. PRINCE, *Primary Examiner.*

JEFFREY NOLTON, *Assistant Examiner.*